March 27, 1951     J. W. OWENS     2,546,232
VEHICLE UNDERFRAME AND FABRICATION
OF MEMBERS THEREOF
Filed July 15, 1946     4 Sheets-Sheet 1
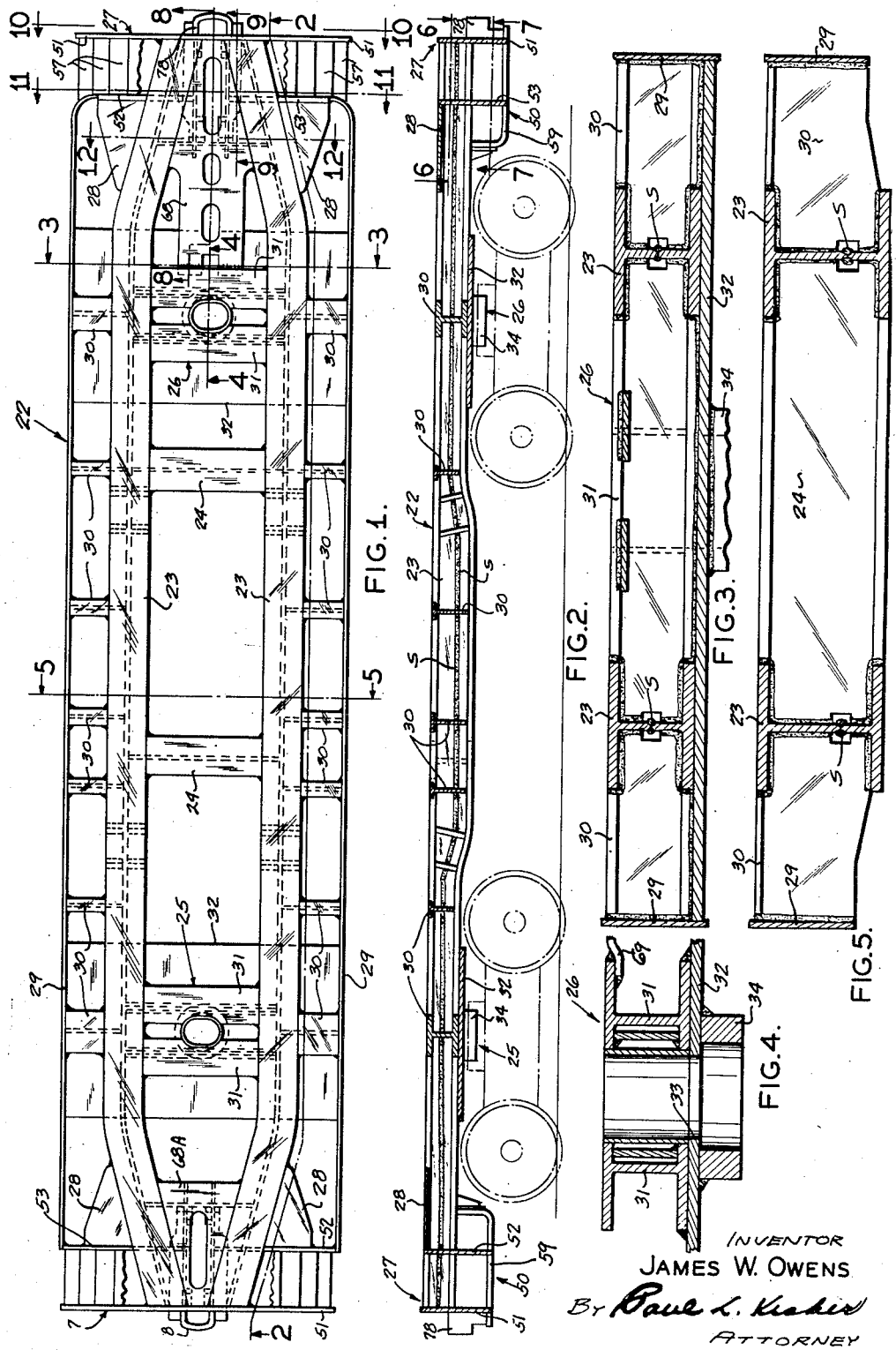
INVENTOR
JAMES W. OWENS
By Paul L. Kiehr
ATTORNEY

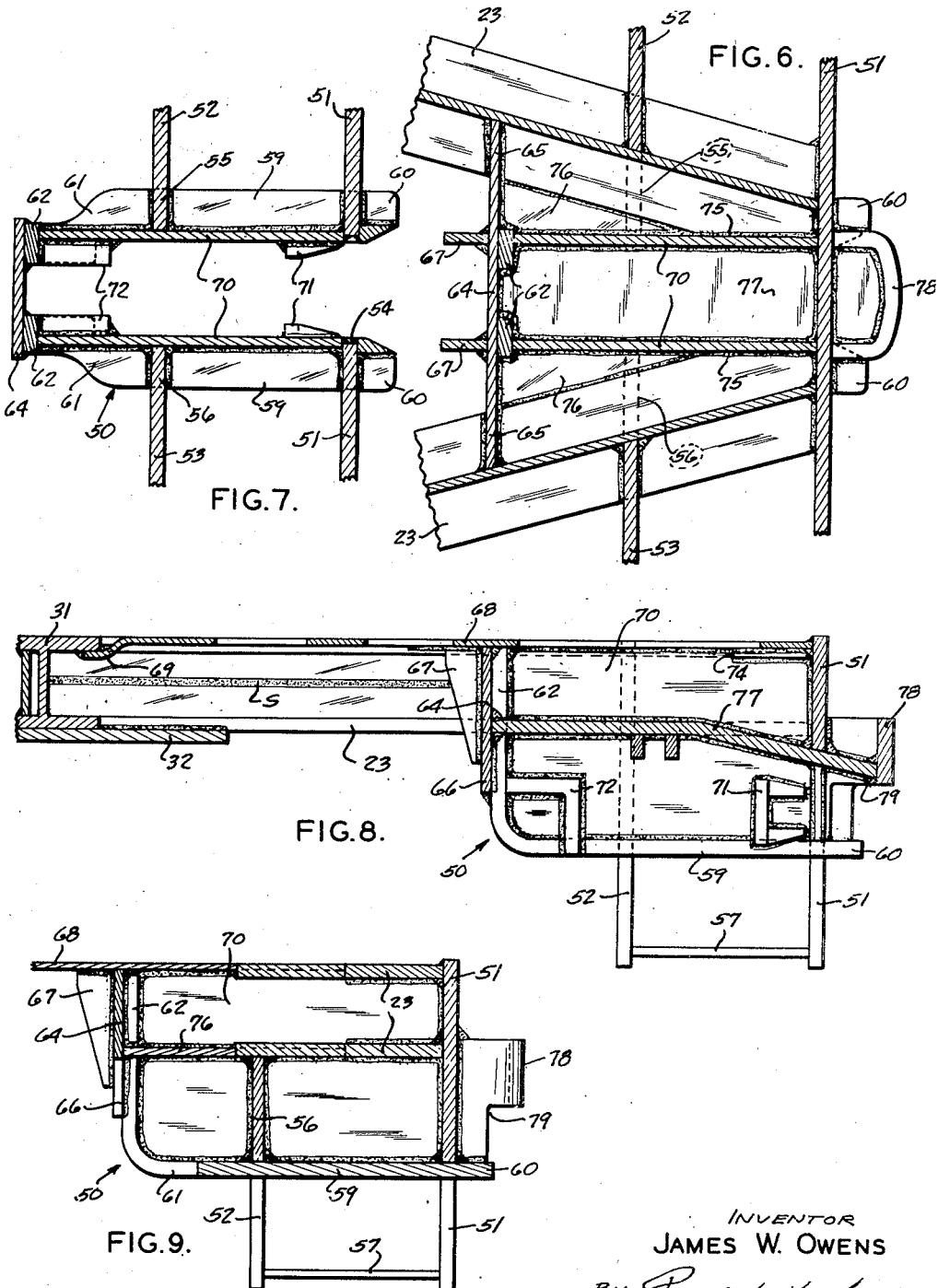

March 27, 1951  J. W. OWENS  2,546,232
VEHICLE UNDERFRAME AND FABRICATION
OF MEMBERS THEREOF
Filed July 15, 1946  4 Sheets-Sheet 3

INVENTOR
JAMES W. OWENS
By Paul L. Kirby
ATTORNEY

March 27, 1951           J. W. OWENS           2,546,232
VEHICLE UNDERFRAME AND FABRICATION OF MEMBERS THEREOF
Filed July 15, 1946                            4 Sheets-Sheet 4
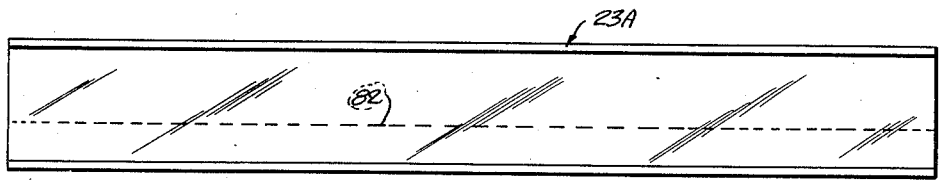
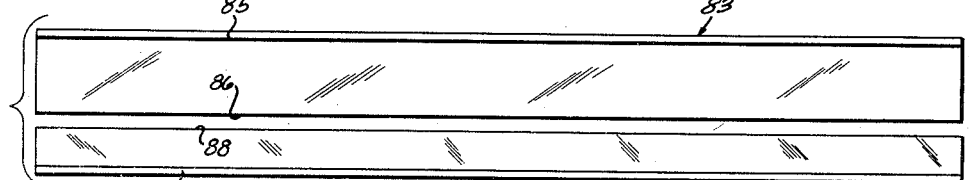
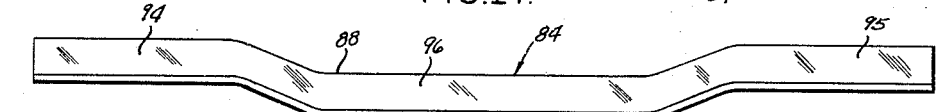
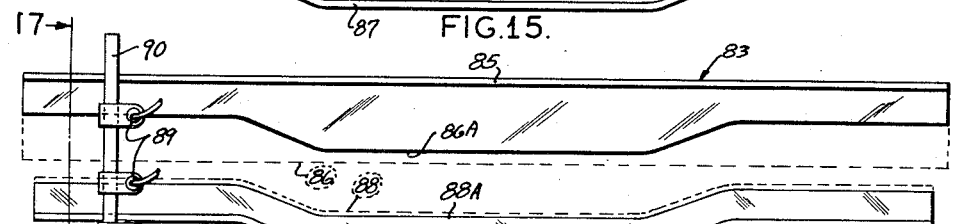
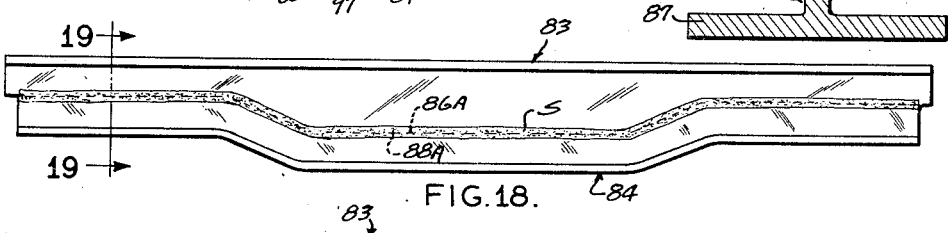
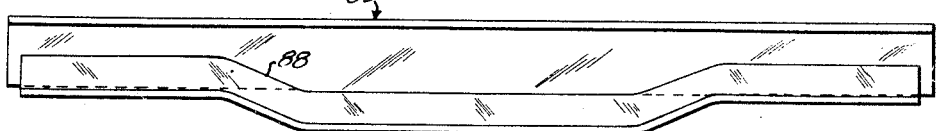
INVENTOR
JAMES W. OWENS
By Paul L. Kirker
ATTORNEY Patented Mar. 27, 1951

2,546,232

UNITED STATES PATENT OFFICE 2,546,232

VEHICLE UNDERFRAME AND FABRICATION OF MEMBERS THEREOF

James W. Owens, Beloit, Wis., assignor to Fairbanks, Morse & Co., Chicago, Ill., a corporation of Illinois Application July 15, 1946, Serial No. 683,645

10 Claims. (Cl. 105—417)

1

This invention relates to vehicle underframe structures and assemblies, and to improvements in the method of fabricating certain structural elements and members of such frame structures.

It is an important object of the present invention to provide an underframe structure for vehicles and particularly railway cars, locomotives and the like, in which the underframe is fabricated of easily obtainable, low cost standard rolled shapes and plates, and is assembled to form an integral, welded structure having improved strength, load and stress characteristics, and of the weight desired.

It is an important object also to provide an underframe structure of the noted type which is arranged for greater simplicity as by the incorporation of a principal center sill assembly formed and constructed to bear the major loads and resist stresses without the need for the side sill members as has been required heretofore.

An object is also to be found in the arrangement and construction of a draft gear supporting assembly for the usual car draft gear and coupler mechanism, the improved supporting assembly acting to transmit buffing stresses and draft loads into the center sill assembly without creating zones of undesirably high stress concentration, and acting to prevent the imposition of loads and stresses on the underframe bolster assemblies.

Another object resides in the form and construction of bellied type girder members or beams which may have many and varied uses but which for present purposes are shown in connection with a vehicle underframe and comprise the principal elements of the vehicle underframe center sill assembly.

Still a further object is to be found in the herein preferred methods of fabricating the girder members of the center sill assembly from standard structural beams having an initial uniform cross section and constant web depth throughout, the method being particularly applicable to the fabrication of bellied type girder members or beams.

Other objects and attending advantages will be pointed out in the course of the detailed description relating to a preferred embodiment of the invention, the same being disclosed in the accompanying drawing, in which:

Fig. 1 is a plan view of the preferred vehicle underframe structure showing general features thereof;

Fig. 2 is a longitudinal side elevation, in section and as seen along line 2—2 of Fig. 1;

2

Figure 10:
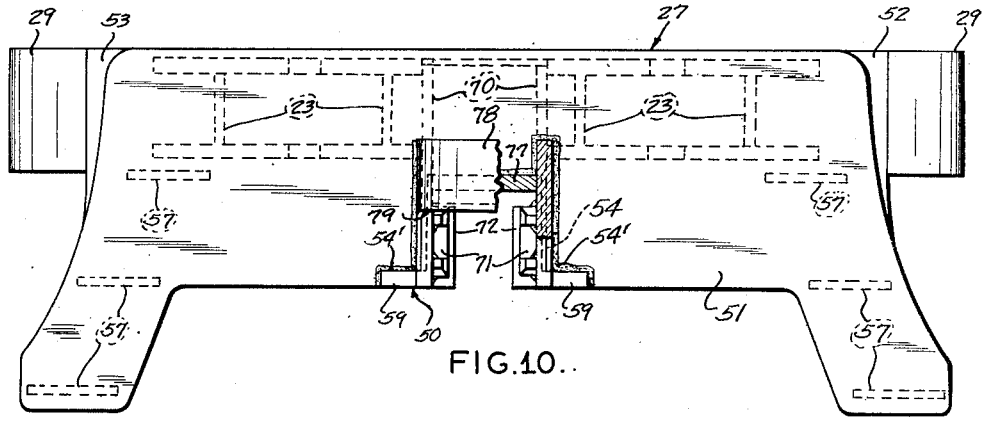
Figure 11:
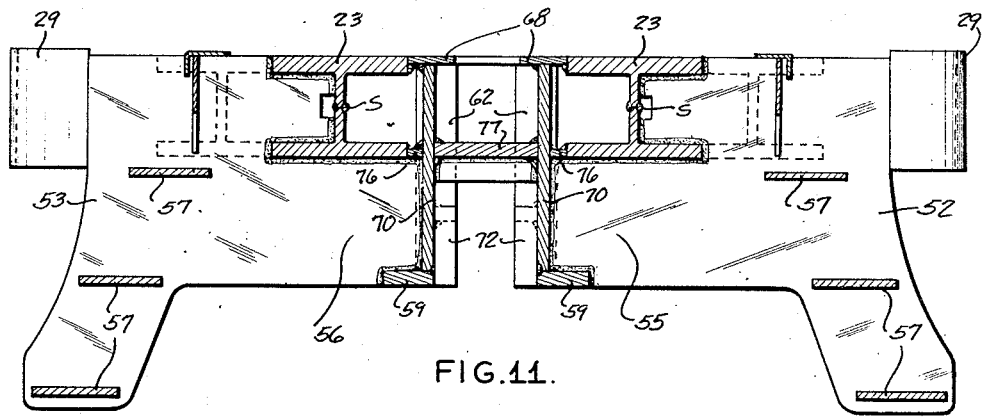
Figure 12:
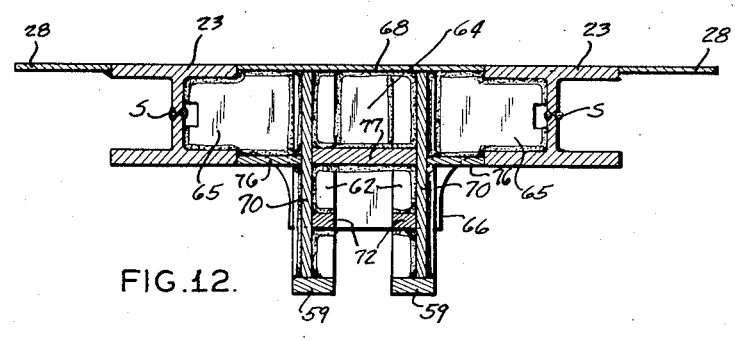

Fig. 3 is an enlarged and transverse sectional elevation of the frame at line 3—3 of Fig. 1;

Fig. 4 is an enlarged and fragmentary and longitudinal sectional elevation at line 4—4 of Fig. 1;

Fig. 5 is an enlarged and further transverse sectional elevational view taken at line 5—5 of Fig. 1;

Fig. 6 is a greatly enlarged and fragmentary sectional plan view taken at line 6—6 in Fig. 2;

Fig. 7 is also an enlarged and fragmentary sectional plan view taken at line 7—7 in Fig. 2;

Fig. 8 is an enlarged and fragmentary longitudinal sectional elevation seen at line 8—8 of Fig. 1;

Fig. 9 is an enlarged detailed sectional view in longitudinal section as taken at line 9—9 of Fig. 1;

Fig. 10 is an end elevational view of the frame as seen along line 10—10 of Fig. 1;

Fig. 11 is a transverse sectional view of the frame taken at line 11—11 of Fig. 1;

Fig. 12 is a further transverse sectional elevational view taken at line 12—12 of Fig. 1;

Fig. 13 is a longitudinal side elevation of a typical beam member of uniform depth and cross section and from which the frame girders are formed;

Fig. 14 is a similar view showing a first step in the method of forming the present underframe girders;

Fig. 15 is a view of a portion of the beam of Fig. 13 subsequent to a forming operation to define an off-set or bellied central zone;

Figs. 16 and 17 are respectively plan and elevational views of a further procedure applicable to the preferred method of forming a standard beam to provide a bellied member, the view of Fig. 17 being taken at line 17—17 of Fig. 16;

Fig. 18 is an assembly view of the bellied girder member as fabricated by the method here preferred;

Fig. 19 is a sectional view through the girder member illustrating a typical weld, between the respective T-sections, as seen at line 19—19 in Fig. 18; and Fig. 20 illustrates an alternate step of the method and one which may be applied in the place of that shown in Figs. 16 and 17, whereby the separately formed T-section shown in Fig. 15 is utilized as a template for determining the subsequent cutting of the cooperating T-section.

Referring now to the several views of the drawing and particularly Figures 1 and 2, the preferred form and structural arrangement of the present vehicle underframe generally indicated at 22, consists of a pair of principal longitudinally extending girder members 23 which constitute a center sill assembly of the underframe. The girder members 23 are secured in parallel spaced relation by means of cross tie members 24 and further by means of bolster assemblies 25 and 26. It will also be observed that end portions of the center sill assembly and particularly the girder members 23 are convergently formed and terminate in end sill assemblies 27. Other features of the general underframe construction include backing plates 28 secured between the end and center sill assemblies, side plates 29 which in the present arrangement extend the length of the underframe and are secured to the respective end sill assemblies, and a plurality of lateral tie elements 30 adapted to support the intermediate portions of the side members 29 upon the center sill assembly.

In Figure 3 there is illustrated a transverse sectional elevation through the underframe illustrating the general construction thereof in the zone forwardly of one of the bolster assemblies 26. As there shown, the principal girder members 23, bolster assembly 26, side members 29 and connector elements 30 are welded along the abutting marginal portions to form an integral structure.

In the assembly of the bolster 26 it will be observed (Figs. 1 and 4) that a pair of I section elements 31 are arranged in spaced relation and are welded to the principal girders and upon a bottom bolster plate 32, which is apertured in the zone between each of the I sections 31, as at 33, for the purpose of providing a suitable connection with truck assemblies, the latter being indicated in phantom outline in Figure 2. More particularly the bottom bolster plate 32 carries thereon a bolster pad 34 which is adapted to engage in a suitable socket or other recess in the truck assembly above mentioned.

Figure 5 illustrates a further transverse sectional view through the vehicle underframe at a zone intermediate the ends thereof and in which it may be observed that the principal girder members 23, cross tie element 24 and side members 29, together with supporting elements 30, are welded along abutting marginal portions to provide an integral frame assembly.

One of the important features of the present invention resides in the construction and formation of the principal girder members 23 to provide a bellied member having an intermediate section of substantially increased depth. This type of girder is commonly referred to as a fish-belly girder in which the end portions thereof have a reduced depth of section relative to the central portion therebetween. The present invention contemplates the fabrication of each of the principal girder members 23 from a single constant depth standard rolled I-section by a method hereinafter to be described, but for the present it will be observed, in Figures 3 and 5, for example, that each of the girders 23 has a welded seam connection S between an upper T-section and a lower T-section. In the view of Figure 3 this welded seam appears substantially along the neutral axis of the interconnecting web; whereas in the view of Figure 5, the welded seam S appears substantially nearer the lower flange of the girder member and below the neutral axis of the beam in the intermediate zone thereof which has been fish-bellied.

A particularly important feature of the invention is to be found in the construction, form and arrangement of end sill assemblies 27 and draft sill assemblies 50, each of the latter being positioned (Figure 2) adjacent to and below an end sill assembly 27. Further details of the end sill and draft sill assemblies may be seen in Figures 6 to 12 inclusive. In these latter views the end sill assembly, for example, at the right hand end of the underframe, as viewed in Figure 1, comprises a single principal end sill plate 51 welded to the adjacent ends of each of the girder members 23, and a pair of secondary end sill plates 52 and 53 which are spaced rearwardly of the principal sill 51 and are welded to and directed outwardly of each of the adjacent girder members 23 and substantially parallel with the principal sill member 51. The principal sill member 51 is suitably cut away or otherwise recessed in a central zone, as at 54 (Fig. 10), to provide for the assembly of the draft sill 50, whereas the secondary sill plates 52 and 53 (Fig. 11) have depending portions 55 and 56 respectively which are spaced to provide an effective continuation of the cut-out 54 in sill 51. In addition to welded securement of sill plates 51, 52 and 53 to the girder members 23, the outer end portions of these sills are formed to provide for step plates 57 (Figs. 1, 10 and 11) which act to strengthen the end sill assembly.

In the preferred structural arrangement, each of the draft sill assemblies 50 includes a pair of rib elements 59 which have an end portion 60 projecting outwardly of the lower lateral notched zones 54' of the larger recess 54 in the principal end sill 51 and which also extend rearwardly to an inwardly offset portion 61 having an upwardly directed end 62. Support for the upwardly directed end portions 62 of each of the rib elements 59 is provided by a backing plate 64 which extends transversely of the underframe for securement to the respective girder members 23. Backing plate 64, as seen in Fig. 12, is formed to provide opposite and laterally extending portions 65 weldedly secured to each of the girder members 23 and a central depending portion 66, the latter portion having a depth to provide a substantial bearing surface for each of the rib elements 59. In addition to the backing plate 64 there is provided a pair of brace plates 67 which are welded to the backing plate 64 and to a top filler plate 68, the latter filler plate being more particularly shown in Figures 1, 8 and 12. As shown, the filler plate extends from welded securement at the rear surface of the principal end sill plate 51 rearwardly to a point of attachment 69 with I-section member 31 of the bolster 26. Filler plate 68 is not considered as an important structural member of the present assembly but is provided for the purpose of forming an attaching member for certain floor plates (not shown) which are positioned on the upper surface of the underframe. The opposite end of the underframe is provided with a filler plate 68A which does not extend to the bolster 25.

sill assembly 50 may be seen in the arrangement

Additional features of construction of the draft assembly 50 may be seen in the arrangement of side plate elements 70 which are carried one on each of the rib elements 59 and are welded at the principal end sill member 51, at the secondary end sill member 52 and to the upstanding end portion 62 of the rib. Each of the side plates 70 carries a front stop 71 and a back stop 72 which are intended to cooperate with a suitable draft gear mechanism (not shown). It will also be observed in Figs. 1 and 8 that a portion of the upper margin of each of the side plates 70 is notched as at 74 to permit the upper flange of each of the girder members 23 to extend uninterruptedly therethrough for welded securement at the principal end sill plate 51. However, the lower flanges of each of the girder members 23 is shown beveled or otherwise cut as at 75 (Fig. 6) to provide a bracing surface against which side plates 70 may abut and to which the latter are welded. Additional support of side plate 70 is provided in the form of triangular filler elements 76 welded to the lower flange of the girder members 23 and at the side plate 70 in the manner shown.

The draft sill assembly further includes a buffer plate 77 which, in the view of Figures 6 and 8, is horizontally positioned between the side plates 70 to extend, from welded securement thereto and at the backing plate 64, through the centrally located, bottom open recess 54 provided in end sill plate 51 for backing support of a striker block 78 which is welded thereto and to the forward surface of sill plate 51. The striker block 78 is suitably notched as at 79 (Figs. 8 and 9) to provide unrestricted access to the draft sill assembly.

It should now be clear that the presently preferred vehicle underframe 22 provides a simple, low cost structure in which the center sill assembly comprises two principal girder members arranged in spaced parallel relation over the greater portion of their length and advantageously convergently directed at the end portions such that draft and buffing loads may be received with a minimum of stress concentrations; in which the end sill assemblies 27 may structurally integrated with the center sill assembly for maximum efficiency; and, in which each of the draft sill assemblies 50 may be arranged for rigid securement to the adjacent end and center sill assemblies such that draft and buffing loads imparted thereto through suitable coupler and draft gear mechanism (not shown) may be transmitted into the underframe without necessitating the imposition of such loads on the respective bolsters 25 and 26. It is particularly a feature hereof to arrange each of the draft sill assemblies 50 independently of the bolsters in the interest of a more simply constructed underframe, for reducing the weight of the bolsters and to eliminate the additional strain usually imposed on the bolsters, thereby further simplifying the bolster construction.

In the fabrication of the above described underframe it is particularly important to note that the greater number of parts and members thereof are standard rolled shapes which require only a minimum of pre-fabrication processing to render the same suitable for use herein. In the case of the center sill assembly, the principal girder members 23 are also fabricated of standard structural shapes of I-section, each having an initial constant cross-section throughout its length. However, these standard members are further formed to a fish-belly contour in order that the load supporting capacity may be improved with a minimum of excess weight.

The preferred forming method is shown in Figs. 13 to 17, wherein an I-section beam having a uniform web of a desired maximum depth for the purpose in view is indicated at 23A. The beam is suitably marked or scribed to indicate a line of cut, as at 82, whereby a pair of T-section elements 83 and 84 are obtained. Element 83 thus has a flanged edge 85 and a web edge 86, and element 84 likewise has a flanged and web edge 87 and 88 respectively. It is preferred that the line 82 be located nearer one flanged edge for a purpose to appear presently, and in cutting the beam 23A into two parts, the T-section elements 83 and 84 will have unequal web portions, as shown in Fig. 14. Cutting of the beam 23A along line 82 may be accomplished by the use of standard flame cutting apparatus, an example of which is partly shown in Fig. 17 wherein torch heads 89 are adjustably sleeved on a carrier rod 90 and a guide wheel 91 is also carried by rod 90 on arm 92. It is obvious that only one torch head 89 is required to make the cut along line 82 (Fig. 13).

In this connection, the preferred method is of distinct advantage to the further handling and forming of the beam since a beam of the size required for use in vehicle underframe structures of the present character may weigh as much as 300 pounds per linear foot and the length may range upwardly of 40 feet. Consequently the individual T-sections 83 and 84 can be handled more easily.

One of the T-section elements and more particularly element 84 (Fig. 15) is further formed in suitable pressing or bending apparatus (not shown) such that its end portions 94 and 95 are off-set relative to a central portion. It will be observed that the flanged edge 87 remains substantially parallel with the web edge 88 and that oppositely inclined sections are formed between the respective end portions and the central portion thereof. The respective T-section elements 83 and 84 are next placed in parallel, spaced relation (Figs. 16 and 17) to rest on the flange edge with blocks 97 arranged to support the webs thereof in substantially horizontal relation. Having accomplished this, the flame cutting apparatus, with a pair of torch heads thereon, is arranged to have its trace wheel 91 in rolling engagement with the flange surface 87. The torch heads 89 are positioned over the web portions and arranged to accomplish simultaneous trimming and forming cuts on the webs of the T-section elements 84 and 83 respectively and thereby produce matching web edges. In the cutting operation a trim piece is generally removed from the web of element 84 to produce a new web edge 88A. Simultaneously scrap sections of the web of element 83 are removed and a new web edge 86A of a character matching with web edge 88A results.

The respective new web edges 86A and 88A are defined by the tracing wheel 91 which follows the contour of the flanged edge 87 of T-section 84, thus maintaining the line of cut and trim parallel thereto at all points along the length of the latter T-section. Moreover, the torch heads 89 are particularly arranged to produce an equal depth of web on the respective T-sections 83 and 84 at the matching end portions thereof. At other portions on T-section 83 the web edge 86A follows the oppositely inclined portions and centrally off-set portion 96 of the T-section 84, thus resulting in a relatively deep web in those portions.

In Figs. 18 and 19, the T-sections 83 and 84 are shown when permanently reunited with the web edges welded in matching abutment, as indicated by the weld seam S. In the fabrication of a bellied type girder, it is important that the weld seam be located on the neutral axis in the respective end portions of relatively shallow web depth so that during the welding thereof they are not heat warped. This feature in the forming of a fish-belly girder avoids a subsequent straightening operation. The location of the weld seam S in the remaining portions of the girder, and particularly along the shallow depth of web of the lower T-section 84 insures that heat stresses produced by the welding operation will be of a low value. As a result, a strong and safe weld is insured throughout the entire length of the girder. In the central portion of the girder, the desirability of the welded seam being on the neutral axis for maintenance of straightness is not as important as at the end portions due to the greater depth of the section and the proportionally larger bending moment available to resist the bending stresses. The location of the weld seam at the neutral axis in the reduced end portions of the girder may be obtained by an initial determination of the cutting line 82 at the time beam 23A is cut into the respective T-section elements 83 and 84, or by suitable spaced arrangement of the torch heads 89.

If it is more desirable, the flame cutting apparatus disclosed in Figs. 16 and 17 may be dispensed with in favor of the alternate step in the method whereby the T-section element of Fig. 15 may be utilized as a template (Fig. 20) for indicating the location of the cutting line on the web of T-section element 83. In this case the web 88 of T-section element 84 provides a guide surface for marking the portions to be removed from the web of the T-section element 83, such that matching web edges may be obtained. Accomplishing this step of the method, the final welded girder will appear as shown in Fig. 18. While the preferred method of simultaneously cutting the respective T-sections to a matching web edge contour is more exact, the alternate step of Fig. 20 has definite appeal in those situations in which appropriate flame cutting apparatus is not available.

Having now fully described the particular features of construction and assembly arrangement of the preferred vehicle underframe, and having pointed out the methods here preferred for the fabrication of fish-bellied girder members forming a part of the underframe generally, it should be understood that obvious modifications of structure and arrangement of the underframe, and changes in the steps of the method here disclosed may be made without departing from the spirit and full intended scope of the invention as the same is defined by the claims hereto appended.

What is claimed is:

1. In a vehicle underframe, the combination: of a center sill assembly comprising a pair of girder members having cross-tie elements securing said girders in substantially parallel and spaced relation; and sill assemblies secured to adjacent ends of said center sill assembly; and a draft sill assembly positioned adjacent each of said end sill assemblies, each draft sill assembly including spaced rib elements secured to the end sill and having end portions extending rearwardly thereof, means structurally relating the rearward end portions of said rib elements with said girder members, and plate elements secured to said rib elements for additionally structurally relating the latter with said end sill and center sill assemblies, said rib elements, means and plate elements being constructed and formed to resist draft and buffing stresses and transmit the same directly and only to said girder members and end sill assembly.

2. In a vehicle underframe, the combination: of a center sill assembly comprising a pair of principal girder members having cross-tie elements securing the same in spaced parallel relation; end sill assemblies secured at each end of the center sill assembly and including a primary and secondary sill member; and a draft sill assembly for each of said end sill assemblies, each draft sill assembly including spaced rib elements secured at one end to said primary sill, means securing the opposite ends of said rib elements to said girder members, and plate elements secured one to each of said rib elements and to said primary and second sills to provide support for draft gear means and transmit buffing and draft loads directly and only into said center and end sill assemblies.

3. In a vehicle underframe, the combination: of a center sill assembly comprising principal longitudinal girder members having cross-ties securing the same in spaced relation, and bolster means; end sill assemblies secured at each end of the center sill assembly in spaced relation with the bolster means; and a draft sill assembly positioned at each end sill to extend rearwardly therefrom, each of said draft sill assemblies including rib elements secured to said end sill assembly and directed rearwardly in spaced relation with said girder members and bolster means, a backing plate secured to said girder members and directed transversely of the length of the center sill assembly to afford rigid securement for said rib elements, and plate means carried by and between said rib elements, girder members and end sill assembly to support a draft gear and transmit draft and buffing loads into said girder members ahead of the bolster means.

4. In a vehicle underframe, the combination: of a center sill assembly comprising principal longitudinal girder members secured in spaced relation and having bolster means secured thereto inwardly of each end thereof; end sill assemblies secured at each end of the center sill assembly; and a draft gear supporting assembly carried at each end of the center sill assembly, each draft gear supporting assembly including a striker member on the end sill, spaced rib elements secured to said end sill and extending rearwardly and upwardly between said girder members to a position spaced from the bolster means, a backing plate secured to each girder member to afford rigid securement for said rib elements, side plate means secured one to each of said rib elements and to said end sill, and other plate means carried between said side plate means to extend from securement with said backing plate and upwardly directed rib elements through the end sill for attachment with said striker member, said draft gear supporting assembly being arranged to transmit draft and buffing loads into said girder members ahead of the bolster means.

5. In a vehicle underframe, the combination of a pair of flanged girders each having constant depth end sections and a central section of greater depth, said girders being secured over the greater portion of their length in parallel, spaced relation and being convergently directed at adjacent end portions to constitute the principal members of an underframe center sill assembly; an end sill assembly carried at each convergently directed end of the center sill assembly, each end sill having a primary sill plate secured to each girder member, spaced secondary sill plates one secured to each girder member, and means securing said sill plates in parallel relation; a body bolster secured to the center sill assembly inwardly of each end sill assembly and adjacent the zone of convergence of the end portions; and a draft gear supporting sill assembly secured between said primary and secondary end sill plates to extend rearwardly and between said girder members in depending relation at each end of the center sill assembly, each draft gear sill assembly including spaced ribs and side plate elements, and a backing plate interconnecting said rib elements and each girder member, the arrangement and construction of the rib and side plate elements and backing plate being such as to transmit draft and buffing loads into the center and end sill assemblies ahead of the body bolsters.

6. A fabricated girder for a vehicle underframe, comprising a first T-section having a substantially straight flanged edge and a web providing straight cut central and end edge portions extending parallel with the flanged edge, said central and end edge portions being connected by inclined web edge portions, and a second T-section having a flanged edge and a web edge centrally off-set relative to the end portions thereof such that the web edges of the respective T-sections match throughout their length, and a weld connection along said matched web edges to secure said T-sections.

7. The method of fabricating a bellied girder member from a single structural member of uniform flanged cross-section throughout its length, the method including the steps of initially cutting longitudinally through the web of the member to obtain separate T-sections, forming the web and flanged edges of one T-section to provide a centrally off-set portion characterized by flanged and web edges which are mutually parallel with the respective flanged and web edges of the end portions, cutting the free edge of the web of the other T-section to an edge contour matching with the web edge of the said one T-section, and reuniting the respective T-sections as by welding along the matched line of abutment of the web edges thereof.

8. The method of fabricating a bellied structural member from a single structural member having an initial uniform flanged cross-section throughout its length, the method including the steps of cutting through the web of the member in a direction substantially parallel to the respective flanged edges to provide a first and second T-section element, off-set forming the first T-section element in a central zone thereof and in a direction normal to the flanged edge such that its flange and web edges are parallel with those of the end zone portions, cutting the web of the second T-section element along a line which is substantially parallel throughout its length with the web edge of the first T-section element to provide a web thereon with a cut edge which is off-set in a central zone thereof, and reuniting the first and second T-section elements by welding along the line of abutment of the respective web edges.

9. The method of fabricating a bellied structural member as set forth in claim 8 and in which the step of cutting the web of the second T-section element is performed such that the depth of web in the respective end zones thereof is substantially equal to the depth of web on the first T-section element to determine the location of the welded abutment therebetween on the neutral axis of the respective end zones.

10. The method of fabricating a bellied structural member from a single structural member having an initial uniform flanged cross-section throughout its length, the method including the steps of cutting through the web of the member in a direction substantially parallel to the respective flanged edges to provide a pair of T-sections, bending the central zone of one T-section to a parallel and off-set position relative to the respective end zones thereof, superposing the web of said one T-section with the web of the other T-section as a template for determining a line of cut on the web of the other T-section for matching abutment with the web of the said one T-section, cutting the web of said other T-section along the cut line thus determined, and locating the respective web edges of the T-sections in matching abutment for welded reunion thereof as a single structural member having a relatively deep web in a central zone and relatively shallow webs in adjacent end zones.

JAMES W. OWENS.

REFERENCES CITED

The following references are of record in the file of this patent:

UNITED STATES PATENTS

| Number | Name | Date |
|---|---|---|
| 790,037 | Dodds | May 16, 1905 |
| 827,646 | Meissner | July 31, 1906 |
| 912,440 | Becker | Feb. 16, 1909 |
| 1,138,615 | Barber | May 11, 1915 |
| 1,594,658 | Bushong | Aug. 3, 1926 |
| 1,698,081 | Baker | Jan. 8, 1929 |
| 2,103,730 | Lewis et al. | Dec. 28, 1937 |
| 2,331,891 | Dean | Oct. 19, 1943 |
| 2,366,709 | Dean | Jan. 9, 1945 |
| 2,394,775 | Hilstrom et al. | Feb. 12, 1946 |